United States Patent [19]

Akiyama

[11] Patent Number: 4,841,379

[45] Date of Patent: Jun. 20, 1989

[54] TIME-BASE ERROR CORRECTION APPARATUS FOR VIDEO TAPE OR DISK PLAYER

[75] Inventor: Toru Akiyama, Saitama, Japan

[73] Assignee: Pioneer Electronic Corporation, Tokyo, Japan

[21] Appl. No.: 97,893

[22] Filed: Sep. 17, 1987

[30] Foreign Application Priority Data

Sep. 17, 1986 [JP] Japan ............................. 61-218618

[51] Int. Cl.[4] ............................................ H04N 5/95
[52] U.S. Cl. ..................................... 358/337; 358/339
[58] Field of Search ..................... 358/320, 324–326, 358/337, 339; 360/36.1, 36.2

[56] References Cited

U.S. PATENT DOCUMENTS

| | | | |
|---|---|---|---|
| 3,748,386 | 6/1973 | Monney et al. | 360/36.2 |
| 4,015,288 | 3/1977 | Ebihara et al. | 358/320 X |
| 4,054,903 | 10/1977 | Ninomiya | 358/326 X |
| 4,127,866 | 11/1978 | Yamashita | 358/326 X |
| 4,145,705 | 3/1979 | Yoshinaka | 358/326 X |
| 4,150,395 | 4/1979 | Pritchard | 358/325 |
| 4,313,129 | 1/1982 | Fukni | 358/326 X |
| 4,415,936 | 11/1983 | Sugiyama | 358/326 X |
| 4,532,541 | 7/1985 | Copper | 358/320 X |
| 4,647,984 | 3/1987 | Suzuki et al. | 358/326 |
| 4,698,694 | 10/1987 | Tomita et al. | 358/320 X |

FOREIGN PATENT DOCUMENTS

| | | |
|---|---|---|
| 0196059 | 1/1986 | European Pat. Off. |
| 0170207 | 6/1986 | European Pat. Off. |
| 2646098 | 4/1977 | Fed. Rep. of Germany |
| 2638896 | 3/1978 | Fed. Rep. of Germany |

OTHER PUBLICATIONS

"A New Technique for Time-Base Stabilization of Video Recorders" by Charles H. Coleman Transactions on Broadcasting, vol. BC-17, No. 1, Mar. 1971 pp. 29–35.

Primary Examiner—L. T. Hix
Assistant Examiner—D. Rutledge
Attorney, Agent, or Firm—Sughrue, Mion, Zinn, Macpeak & Seas

[57] ABSTRACT

A time-base error correction circuit for use in a video disk player, video tape player, or the like, with which all residual time-base error is eliminated. A detector circuit detects the amount of residual time-base error between the reproduced video signal and a write clock signal. A variable delay circuit disposed prior to a memory in which the video signal is stored adjusts the delay of the reproduced video signal accordingly.

3 Claims, 3 Drawing Sheets

TIME-BASE ERROR CORRECTION APPARATUS FOR VIDEO TAPE OR DISK PLAYER

BACKGROUND OF THE INVENTION

The present invention relates to a time-base error correction apparatus used in a video tape recorder, video disk player, or the like, for correcting time-base error in the reproduced video signal.

FIG. 1 is a block diagram showing a conventional time-base error correction apparatus. In this drawing, an A/D converter 1 converts to digital form an input reproduced analog video signal. The output of the A/D converter 1 is stored in a memory 3 and later read out and converted to analog form by a D/A converter 2. Address generator circuits 4 and 5 respectively generate addresses used in writing and reading operations of the memory 3. A reference signal generator circuit 6 produces a read clock (RCK) and a read H start pulse (RHS) on the basis of an output of a quartz oscillator or the like for reading operations. Separator circuits 7 and 8 separate a horizontal synchronizing signal from the video signal. The output of the separator circuit 7 is applied to a comparator circuit 9 and there compared with the output of frequency divider 11, which divides the output of a voltage-controlled oscillator (VCO) 10 by a predetermined factor, for example, by 1/910. The output of the comparator circuit 9 is applied to the voltage-controlled oscillator 10 through a low-pass filter 12 so as to control the oscillation frequency of the voltage-controlled oscillator 10. That is, the comparator circuit 9, the low-pass filter 12, the voltage-controlled oscillator 10, and the frequency divider 11 constitute a phase-locked loop (PLL) circuit 13.

The output of the voltage-controlled oscillator 10 is applied as a write clock (WCK) to the A/D converter 1 and the address generator circuit 4 through a phase shifter 16, and the output of the frequency divider 11 is applied as a write H start pulse (WHS) to the address generator circuit 4 through a phase shifter 17. The output of the voltage-controlled oscillator 10 is applied also to a frequency divider 14 to be divided by a predetermined value, for example, by ¼. A comparator circuit 15 compares the output of the frequency divider 14 with the output of the separator circuit 8 to obtain an error signal used to control the amount of phase shifting imposed by each of the phase shifters 16 and 17.

The horizontal synchronizing signal separated by the separator circuit 7 is thus applied to the PLL circuit 13 to lock the PLL circuit 13 to the phase of the reproduced horizontal synchronizing signal. The phase of a signal of a predetermined frequency (for example, a frequency four times as high as that of the color subcarrier signal $f_c$) and the phase of a signal frequency-divided by 1/910 by the frequency divider 11 are synchronized with the phase of the reproduced horizontal synchronizing signal.

On the other hand, after being divided by ¼ by the frequency divider 14, the output of the voltage-controlled oscillator 10 is applied to the comparator circuit 15. The comparator circuit 15 compares the color burst signal produced by the separator circuit 8 with the output signal of the frequency divider circuit 14 to thereby produce a signal indicative of the phase difference between the color burst signal and the output signal of the frequency divider circuit 14. The output signal of the comparator circuit 15 corresponds to the amount of time-base error (residual time-base error) between the video signal and the write clock (and the write H pulse), which can not be followed only by locking the PLL circuit 13 at the reproduced horizontal synchronizing signal, and the amount of phase shift imposed by the phase shifters 16 and 17. Accordingly, there is no relative time-base error between the video signal and either the write clock produced from the phase shifter 16 or the write H start pulse produced from the phase shifter 17 (both the absolute time-base errors are equal to each other).

The A/D convertor 1 samples the video signal corresponding to the write clock to digitize the video signal. The address generator circuit 4 generates an address at every write clock, and the memory 3 stores the sampled value at the indicated address at every write clock. The address generator circuit 4 is reset whenever the write H start pulse is applied to the address generator circuit 4. Thus, each sampled value is stored at a predetermined address for every line (H).

The address generator circuit 5 generates an address for each read clock pulse (having the same frequency as that of the write clock) produced by the reference signal generator circuit 6. The address generator circuit 5 is also reset whenever the read H start pulse is applied to the address generator circuit 5. Accordingly, a predetermined address is repeatedly generated for every line. The value read out of the specified address of the memory 3 at the timing of the read clock is converted into an analog signal by the D/A converter circuit 2. The read clock has no time-base error, and hence the time-base error of the video signal produced from the D/A conversion circuit 2 is corrected.

However, there is usually some residual time-base error, typically about several hundred nanoseconds, in the PLL circuit 13. The signal applied to the phase shifter 16 has a period of about 70 nsec $(=\frac{1}{4}f_c)$. Accordingly, in order to correct the residual time-base error of about several hundred nsec, the signal applied to the phase shifter 16 must be first frequency-divided by 1/N, then phase shifted, and thereafter frequency-multiplied by the same factor N. As a result, the circuitry becomes complicated.

Further, not only the write clock, but also the write H start pulse is essential to generate an address for every line, and therefore two phase shifters are required because the write clock and the write H start pulse must be synchronous with each other. Further, it is necessary to highly accurately adjust the shifters to make them coincident with each other in sensitivity, in operation point, and the like, and moreover a highly accurate compensation circuit is essential to compensate for changes in temperature and the like.

SUMMARY OF THE INVENTION

It is therefore an object of the present invention to overcome the problems in the prior art apparatus as described above.

It is another object of the present invention to provide a time-base error correction apparatus in which the amount of delay of the video signal is controlled in the preceding stage in which time-base error is corrected in a digital manner.

In order to attain the above objects, the time-base error correction apparatus according to the present invention comprises an A/D converter circuit for analog-to-digital conversion of an input video signal on the basis of a predetermined write clock, a memory for storing the output of the A/D converter circuit, a D/A converter circuit for digital-to-analog converting the output of the memory on the basis of a read clock, a separator circuit for separating a synchronizing signal from the video signal, a PLL circuit for generating a write clock corresponding to the output of the separator circuit, a detector circuit for producing a residual time-base error signal indicative of the amount of time-base error between the video signal and the write clock, and a variable delay circuit for delaying the video signal on the basis of the residual time-base error signal and for applying the delayed signal to the A/D converter circuit.

In the time-base error correction apparatus according to the present invention, the video signal is delayed corresponding to the residual time-base error signal and then analog-to-digital converted. The analog-to-digital converted signal is first stored in the memory at the timing of the write clock, read out of the memory at the timing of the read clock, and then digital-to-analog converted into an output analog signal.

BRIEF DESCRIPTION OF THE DRAWINGS

Other objects and features of the invention will become apparent during the following discussion of the accompanying drawings, wherein.

DESCRIPTION OF THE PREFERRED EMBODIMENTS

Figure 1:
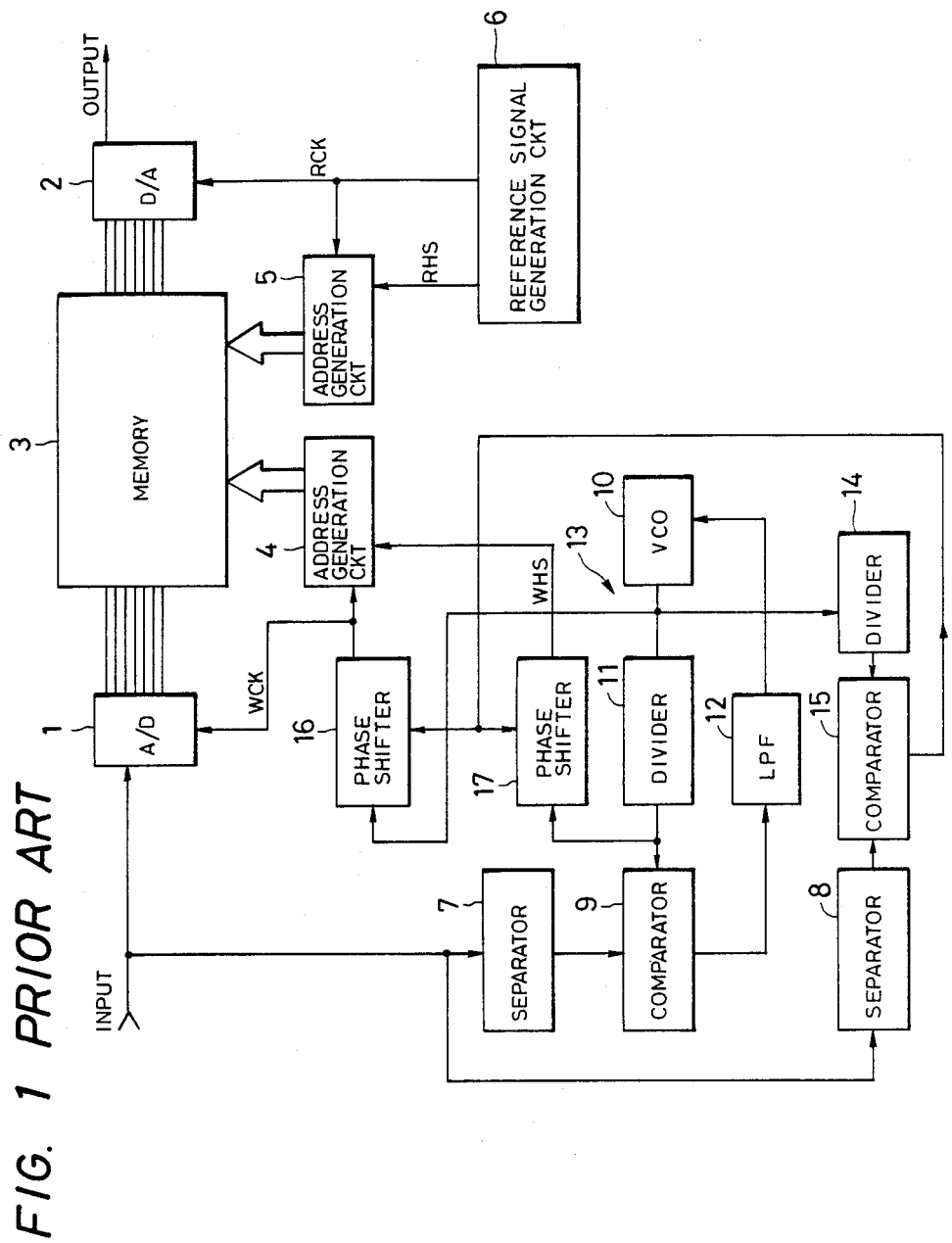
FIG. 1 is a block diagram of a conventional time-base error correction apparatus.

Referring to the drawings, preferred embodiments of a time-base error correction apparatus constructed according to the present invention will be described.

Figure 2:
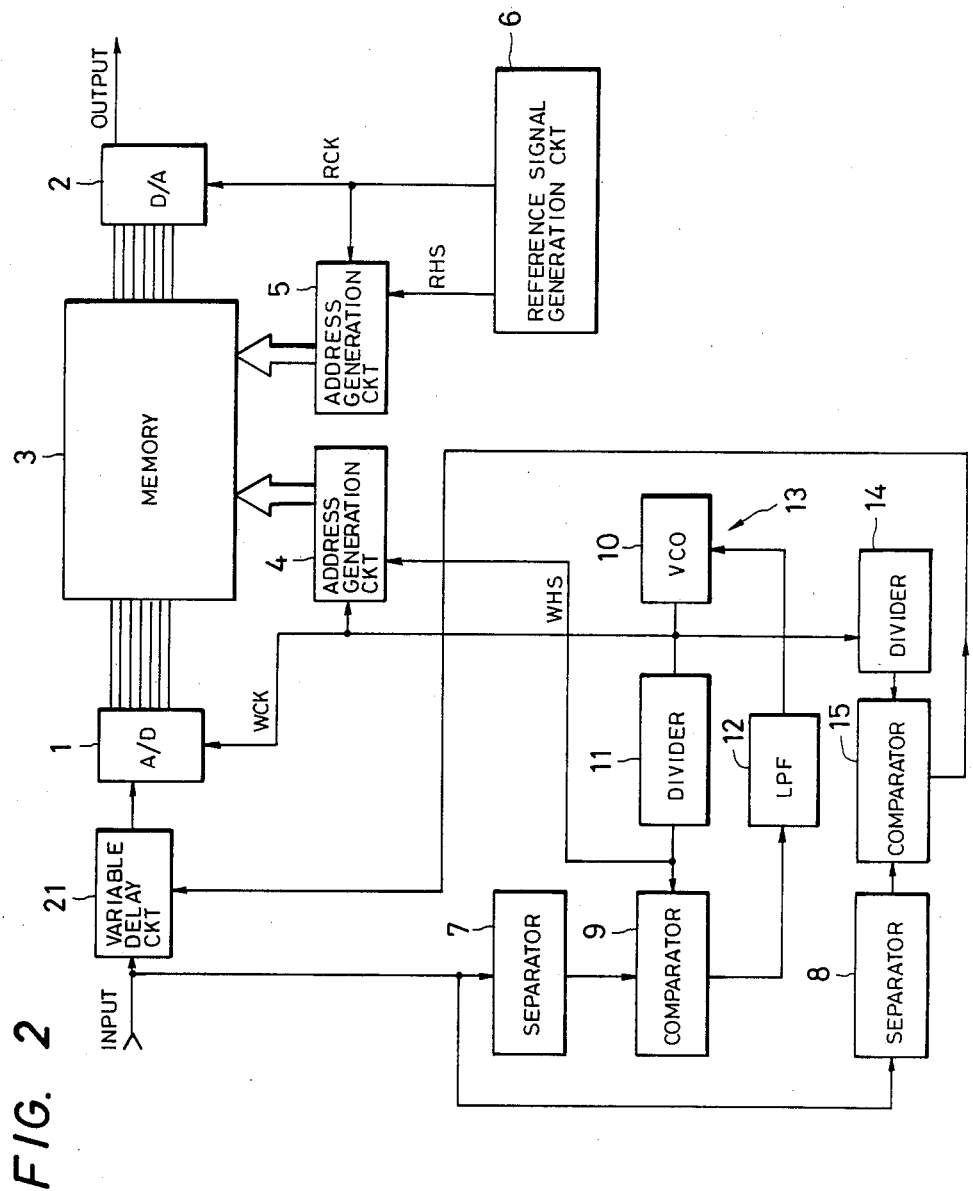
FIG. 2 is a block diagram of a first preferred embodiment of a time-base error correction apparatus according to the present invention.

FIG. 2 is a block diagram of a first preferred embodiment of a time-base error correction apparatus according to the present invention, in which elements corresponding to those in FIG. 1 are correspondingly referenced. In FIG. 2, there is provided a variable delay circuit 21 constituted, for example, by a CCD, VCO, or the like. A video signal is applied to an A/D converter circuit 1 through the variable delay circuit 21. The amount of delay is controlled in accordance with the output of a comparator circuit 15. The arrangement of the other elements is the same as in FIG. 1, except that the phase shifters 16 and 17 are omitted.

Similar to the case of FIG. 1, a horizontal synchronizing signal separated from the video signal by a separator circuit 7 is applied to a PLL circuit 13, and the PLL circuit 13 produces a write clock and a write H start pulse, which are synchronized with the phase of the horizontal synchronizing signal. As described above, however, there is a residual time-base error, which the PLL circuit 13 cannot follow, between the write clock (the write H start pulse) and the video signal.

The write clock is frequency-divided by ¼ by a frequency divider 14 and applied to a comparator circuit 15. The comparator circuit 15 compares a color burst signal separated by the separator circuit 8 with the output signal of the frequency divider circuit 14 to thereby produce a signal indicative of the amount of time-base error therebetween. That is, the separator circuit 8, the frequency divider 14, and the comparator circuit 15 constitute a circuit for detecting the amount of residual time-base error which the PLL 13 cannot follow. The output of the comparator circuit 15 is applied to a variable delay circuit 21 to control the amount of the delay imposed thereby. Accordingly, in the output video signal from the delay circuit 21, that is, the video signal applied to the variable delay circuit 21 and delayed by a predetermined amount in the variable delay circuit 21, the residual time-base error component has been eliminated.

Since the residual error has been eliminated, the video signal produced from the variable delay circuit 21 and applied to the A/D converter circuit 1 is completely coincident with the write clock in phase. Accordingly, similar to the above case of FIG. 1, when data sampled at the timing of the write clock (the write H start pulse) and stored in the memory 2 is read out at the timing of the read clock (the read H start pulse) and D/A converted, the resulting output has no time-base error.

Figure 3:
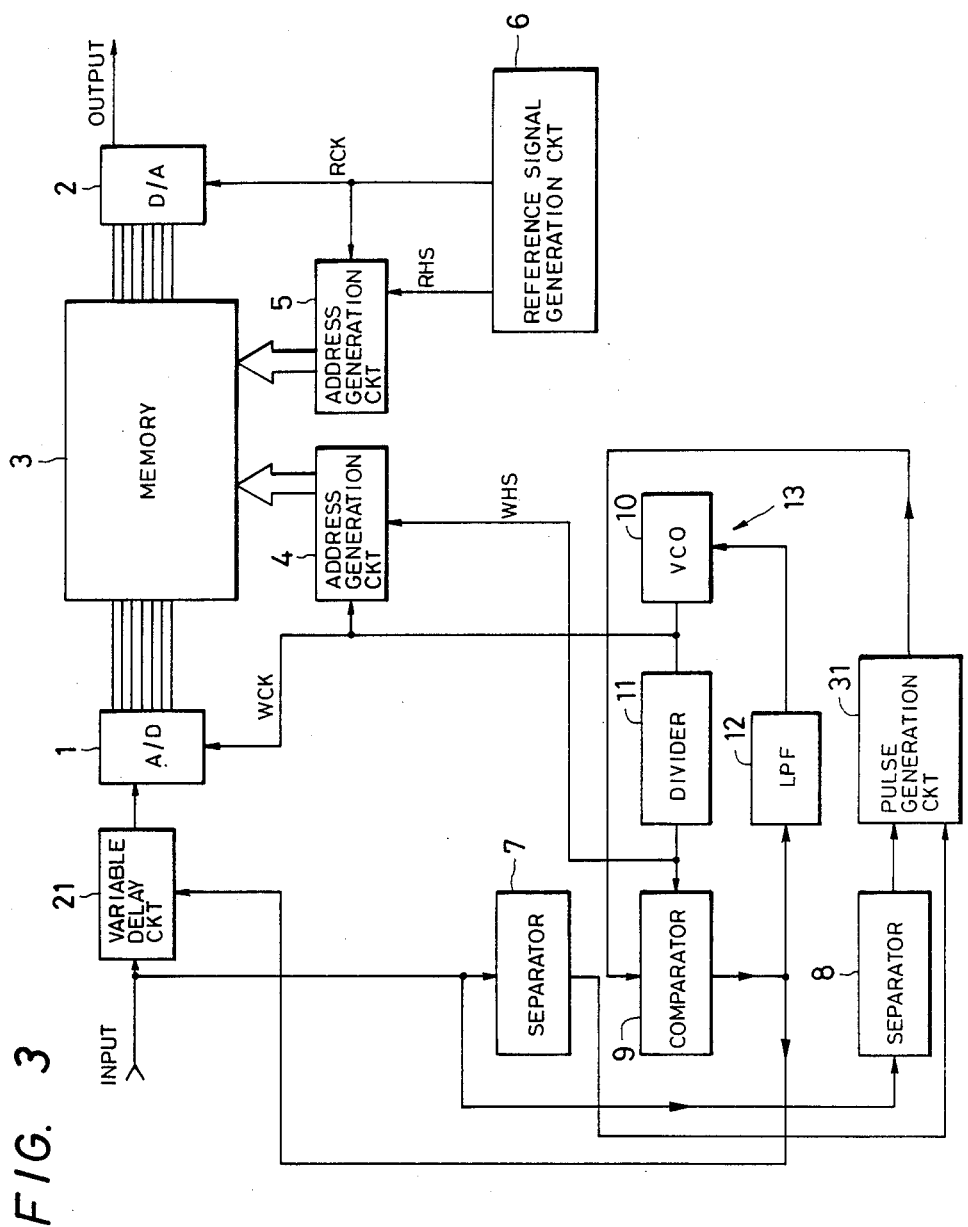
FIG. 3 is a block diagram of another embodiment of the same.

FIG. 3 shows another embodiment of a time-base error correction apparatus according to the present invention. In this embodiment, the horizontal synchronizing signal and the color burst signal separated by separator circuits 7 and 8, respectively, are applied to a pulse generator circuit 31. The pulse generator circuit 31 detects one cycle of the color burst signal at a predetermined time position after arrival of the horizontal synchronizing signal and produces a detection signal accordingly. That is, although the frequency of the detection signal is coincident with that of the horizontal synchronizing signal, the accuracy of its phase is equal to that of the color burst signal. Instead of the output of the separator circuit 7, the detection signal of the pulse generator circuit 31 is applied to the PLL circuit 13. Accordingly, in this case the output of the comparator circuit 9 forming part of the PLL circuit 13 is indicative of the amount of residual time-base error. This signal is applied directly to a variable delay circuit 21. That is, in this embodiment, the PLL circuit 13 constituted by the comparator circuit 9, low-pass filter 12, and voltage-controlled oscillator 10, and the frequency divider 11, also constitutes a detector circuit together with the pulse generator circuit 31.

It is apparent that the present invention can be applied to not only a reproducing device employing the NTSC system, but also to devices using the PAL system, the SECAM system, etc.

As described above, according to the present invention, the inventive time-base error correction apparatus comprises an A/D converter circuit for analog-to-digital converting an input video signal on the basis of a predetermined write clock, a memory for storing the output of the A/D converter circuit, a D/A converter circuit for digital-to-analog converting the output of the memory on the basis of a read clock, a separator circuit for separating a synchronizing signal from the video signal, a PLL circuit for generating the write clock corresponding to the output of the separation circuit, a detector circuit for detecting the amount of residual time-base error between the video signal and the write clock, and a variable delay circuit for delaying the video signal on the basis of the residual time-base error signal and for applying the delayed signal to the A/D converter circuit. Accordingly, the time-base error can be accurately corrected through a simple arrangement and adjustment becomes unnecessary.

What is claimed is:

1. A time-base error correction apparatus comprising:
   an A/D converter circuit for analog-to-digital conversion of an input video signal on the basis of a write clock;
   a memory for storing an output of said A/D converter circuit;
   a D/A converter circuit for digital-to-analog conversion of an output of said memory on the basis of a read clock;
   a separator circuit for separating a synchronizing signal from said video signal;
   a PLL circuit for generating said write clock in response to an output of said separator circuit;
   a detector circuit for producing a residual time-base error signal representing an amount of time-base error between said video signal and said write clock; and
   a variable delay circuit for delaying said video signal on the basis of said residual time-base error signal, a resulting delayed signal being applied to an input of said A/D converter circuit.

2. The time-base error correction apparatus of claim 1, wherein said detector circuit comprises a separator circuit for separating a color burst signal from said video signal, a frequency divider for frequency dividing said write clock by a predetermined factor, and a phase comparator for comparing in phase said color burst signal and an output of said frequency divider, said residual time-base error signal being produced at an output of said phase comparator.

3. The time-base error correction apparatus of claim 1, wherein said detector circuit comprises a first separator circuit for separating a color burst signal from said video signal, a second separator circuit for separating a horizontal synchronizing signal from said video signal, a pulse generator receiving as inputs said color burst signal and said horizontal synchronizing signal and producing a pulse by detecting one cycle of said color burst signal at a predetermined time after arrival of a pulse of said horizontal synchronizing signal, and a phase comparator receiving as inputs an output of a frequency divider of said PLL circuit and an output of said pulse generator, said residual time-base error signal being produced as an output of said phase comparator.

* * * * *